United States Patent

Kitao et al.

[11] Patent Number: 4,647,411
[45] Date of Patent: Mar. 3, 1987

[54] 5,6,7,8-TETRAFLUOROANTHRAQUINONE DERIVATIVES

[75] Inventors: Teijiro Kitao, Tondabayashi; Masaru Matsuoka, Tenri; Osamu Kaieda, Osaka, all of Japan

[73] Assignee: Nippon Shokubai Kagaku Kogyo Co., Ltd., Osaka, Japan

[21] Appl. No.: 790,732

[22] Filed: Oct. 24, 1985

[30] Foreign Application Priority Data

Nov. 6, 1984 [JP] Japan .................... 59-232490
Feb. 15, 1985 [JP] Japan .................... 60-26167

[51] Int. Cl.⁴ .................... C07C 50/24; C07C 97/24
[52] U.S. Cl. .................... 260/381; 260/383; 260/384; 260/694
[58] Field of Search ............ 260/381, 383, 384, 694

[56] References Cited

U.S. PATENT DOCUMENTS 2,013,657  9/1935  Johnson .................... 260/381
2,871,244  1/1959  Kamlet .................... 260/384

FOREIGN PATENT DOCUMENTS 2916957  11/1979  Fed. Rep. of Germany ...... 260/381
187040   11/1966  U.S.S.R. .................... 260/381
188986   12/1966  U.S.S.R. .................... 260/381
420613    8/1974  U.S.S.R. .................... 260/384

OTHER PUBLICATIONS

Kim, Chemistry Express, vol. 1, No. 2, 1986, pp. 129–132, "Syntheses of Functional Anthraquinone Dyes from Tetrafluorophthalic Anhydride".

Hosoda et al., Gihodo K.K., 11/30/57, pp. 562–563, 566–567.

Fokin et al., Chemical Abstracts, vol. 67, No. 43579w, 1967, "Reactions of Polyhaloanthraquinones with Nucleophilic Reagents".

Primary Examiner—Glennon H. Hollrah
Assistant Examiner—Raymond Covington
Attorney, Agent, or Firm—Omri M. Behr

[57] ABSTRACT

A 5,6,7,8-tetrafluoroanthraquinone derivative represented by the general formula I:

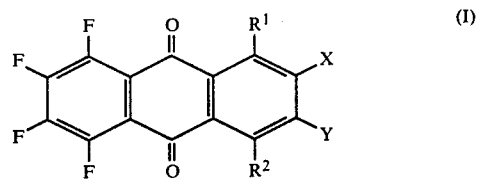

wherein $R^1$ and $R^2$ independently stand for —OH or

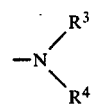

(where $R^3$ and $R^4$ independently stand for hydrogen an alkyl of 1 to 4 carbon atoms or a phenyl) and X and Y independently hydrogen atom or a halogen atom.

12 Claims, No Drawings

5,6,7,8-TETRAFLUOROANTHRAQUINONE DERIVATIVES

BACKGROUND OF THE INVENTION

1. Field of the Invention

This invention relates to 5,6,7,8-tetrafluoroanthraquinone derivatives and to a method for the manufacture thereof.

2. Description of Prior Art

Quinizarins and anthraquinonylamines are known as disperse dyes or pigments possessing high lightfastness and high heat-resisting property or as raw materials therefor. Their lightfastness and heat-resisting property, however, are still short of being fully satisfactory. Methods for the manufacture of these compounds have already been known to the art. For example, a quinizarin is synthesized by subjecting phthalic anhydride and a hydroquinone to Friedel-Crafts reaction. An anthraquinonylamine is synthesized by reducing a quinizarin into a leucoquinizarin with a reducing agent such as metallic tin, a tin compound, metallic zinc, or a reducing agent such as alkali metal thiosulfate and substituting the resultant leucoquinizarin for the hydroxyl group at the 1- or 4-position of an alkylamine or a phenylamine group.

Incidentally, fluorinated quinizarins or fluorinated anthraquinonylamines have never been known to the art. Methods for manufacture of such fluorianted products have never been known to the art.

An object of the present invention, therefore, is to provide 5,6,7,8-tetrafluoroanthraquinone derivatives, which are novel compounds, and a method for the manufacture thereof.

Another object of this invention is to provide 5,6,7,8-tetrafluoroanthraquinone derivatives, which serve as disperse dyes or pigments of very high lightfastness and heat-resisting property and as raw materials therefor and a method for the manufacture thereof.

SUMMARY OF THE INVENTION

The objects described above are accomplished by 5,6,7,8-tetrafluoroanthraquinone derivatives which are represented by the general formula I:

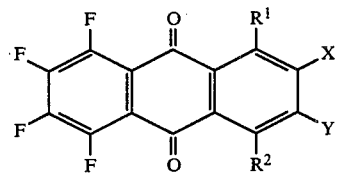

wherein $R^1$ and $R^2$ independently stand for —OH or

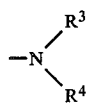

(where $R^3$ and $R^4$ independently stand for hydrogen an alkyl of 1 to 4 carbon atoms or a phenyl) and X and Y independently hydrogen atom or a halogen atom.

DESCRIPTION OF PREFERRED EMBODIMENT

The 5,6,7,8-tetrafluoroanthraquinone derivatives of the invention are the compounds which are represented by the aforementioned general formula I. In the formula, $R^1$ and $R^2$ independently stand for —OH or

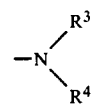

(where $R^3$ and $R^4$ independently stand for hydrogen an alkyl of 1 to 4 carbon atoms or a phenyl) and X and Y independently hydrogen atom or a halogen atom. Where $R^1$ and $R^2$ both are —OH, X and Y are desired both to be a hydrogen atom or a halogen atom. The halogen atom may be fluorine, chlorine, bromine, or iodine. Among other halogens, bromine proves particularly desirable. The compounds meeting the description are 5,6,7,8-tetrafluoroquinizarins represented by the following general formula II.

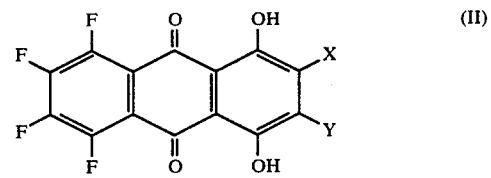

Where $R^1$ is

(wherein $R^3$ and $R^4$ independently stand for hydrogen atom, an alkyl of 1 to 4 carbon atoms, or a phenyl) and $R^2$ stands for —OH or

(where $R^3$ and $R^4$ have the same meanings as defined above), X and Y are desired both to be a hydrogen atom. The compounds which meet the foregoing description are 5,6,7,8-tetrafluoroanthraquinonylamines represented by the following general formula III.

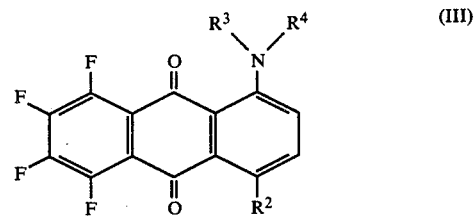

The 5,6,7,8-tetrafluoroquinizarins which are novel compounds represented by the general formula II possess more conspicuous characteristics than quinizarins containing no fluorine. For examples, they are useful as disperse dyes or pigments possessing high lightfastness and heat-resisting property or as raw materials for disperse dyes or pigments possessing high lightfastness and heat-resisting property. Further, these compounds are useful as raw materials for functional coloring matters possessing special functions different from the functions of quinizarins containing no fluorine.

Concrete examples of the 5,6,7,8-tetrafluoroquinizarin represented by the aforementioned general formula II are 5,6,7,8-tetrafluoroquinizarin, 2,3,5,6,7,8-hexafluoroquinizarin, 2,3-dichloro-5,6,7,8-tetrafluoroquinizarin, 2,3-dibromo-5,6,7,8-tetrafluoroquinizarin, 2,3-diiodo-5,6,7,8-tetrafluoroquinizarin, 2,5,6,7,8-pentafluoroquinizarin, 2-chloro-5,6,7,8-tetrafluoroquinizarin, 2-bromo-5,6,7,8-tetrafluoroquinizarin, and 2-iodo-5,6,7,8-tetrafluoroquinizarin.

A 5,6,7,8-tetrafluoroquinizarin represented by the general formula II is produced by causing tetrafluorophthalic anhydride to react in the presence of an effective amount of a Friedel-Crafts catalyst with a hydroquinone compound represented by the general formula IV:

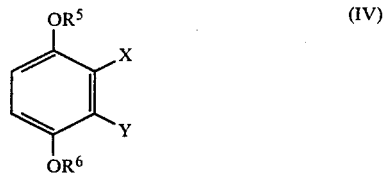

(IV)

wherein $R^5$ and $R^6$ independently stand for a hydrogen atoms or an alkyl of 1 to 4 carbon atoms, preferably a hydrogen atom or methyl, and X and Y have the same meanings as defined above. Where X and Y are both a hydrogen atom, the aforementioned 5,6,7,8-tetrafluoroquinizarin is produced by causing tetrafluorophthalic anhydride to react with hydroquinone or 1,4-dialkoxybenzene. Similarly, a 5,6,7,8-tetrafluoroquinizarin having either or both of the 2- and 3-positions thereof halogenated can be produced by the reaction of tetrafluorophthalic anhydride with a hydroquinone having either or both of the 2- and 3-positions thereof halogenated and a 1,4-dialkoxybenzene having either or both of the 2- and 3-positions thereof halogenated. It may otherwise be produced by newly halogenating the 2- and/or 3-position of a 5,6,7,8-tetrafluoroquinizarin obtained by the aforementioned method.

The amount of the hydroquinone represented by the general formula IV, to be used in the reaction mentioned above, falls in the range of 1.0 to 2.0 mols, preferably 1.2 to 1.5 mols, per mol of the tetrafluoro-phthalic anhydride.

The Friedel-Crafts catalyst for use in the reaction mentioned above may be any of the Friedel-Crafts catalysts such as aluminum chloride and aluminum bromide which are used generally in the art. The amount of the Friedel-Crafts catalyst to be used is in the range of 2.0 to 20 mols, preferably 5 to 15 mols, per mol of the tetrafluoro-phthalic anhydride.

The reaction is generally effected by gradually adding tetrafluoro-phthalic anhydride and the compound of the general formula IV into the molten mass of the Friedel-Crafts catalyst, stirring the resultant mixture at an elevated temperature in the range of 90° to 250° C., preferably 120° to 220° C. for a period of 15 to 120 minutes, preferably 20 to 60 minutes, and pouring the stirred mixture into cold water.

The 5,6,7,8-tetrafluoroanthraquinonylamines of the present invention which are novel compounds represented by the aforementioned general formula III possess more conspicuous characteristics than anthraquinonylamines containing no fluorine. For example, they are useful as disperse dyes or pigments of high color-fastness and heat-resisting property or as raw materials thereof.

Further, these compounds possess special functions different from the functions of anthraquinonylamines possessing no fluorine. For example, they are useful as raw materials for such functional coloring matters as dichromatic coloring matters for liquid crystal display and coloring matters for electrochromic display elements. Particularly, 5,6,7,8-tetrafluoro-1,4-bis(methylamino)anthraquinone shown in Example 1 possesses an absorption wavelength at 662 nm and exbibits a color tone of the so-called turkey blue hue and, therefore, proves highly useful as a transfer type subliming dye, a transfer type ink, or a liquid crystal display dichromic coloring matter.

Typical examples of the 5,6,7,8-tetrafluoroanthraquinonylamine of this invention represented by the aforementioned general formula III are 1-amino-5,6,7,8-tetrafluoro-4-hydroxyanthraquinone, 1,4-diamino-5,6,7,8-tetrafluoroanthraquinone, 5,6,7,8-tetrafluoro-1-hydroxy-4-methylaminoanthraquinone, 5,6,7,8-tetrafluoro-1,4-bis(methylamino)-anthraquinone, 1,4-bis(isopropylamino)-5,6,7,8-tetrafluoroanthraquinone, 1,4-bis(butylamino)-5,6,7,8-tetrafluoroanthraquinone, 5,6,7,8-tetrafluoro-1,4-bis(dimethylamino)-anthraquinone, and 5,6,7,8-tetrafluoro-1,4-bis(phenylamino)-anthraquinone.

A 5,6,7,8-tetrafluoroanthraquinonylamine represented by the general formula III is obtained by reducing the aforementioned 5,6,7,8-tetrafluoroquinizarin into a 5,6,7,8-tetrafluoroleucoquinizarin and heating the reduced product, either simultaneously with or subsequently to the reduction, in conjunction with an amine represented by the general formula V:

(V)

wherein $R^3$ and $R^4$ have the same meanings as defined above, thereby effecting substitution of the hydroxyl group at the 1- and/or 4-position thereof.

The amount of the amine of the general formula V to be used is in the range of 0.5 to 200 mols, peferably 20 to 100 mols, per mol of the 5,6,7,8-tetrafluoroquinizarin. Examples of the reducing agent are metals such as metallic tin, a stannous compound such as stannous acetate and stannous chloride, metallic zinc or an alkali metal thiosulfate such as sodium thiosulfate and potassium thiosulfate. The amount of the reducing agent to be used is in the range of 0.5 to 5 mols, preferably 1 to 3 mols, per mol of the 5,6,7,8-tetrafluoroquinizarin. The reduction reaction is carried out at a temperature in the range of 60° to 200° C., preferably 90° to 130° C. for a period of 0.1 to 24 hours, preferably 0.5 to 10 hours under autogeneous pressure. This reaction may be carried out in an organic solvent such as acetic acid and propionic acid, in an aqueous hydrochloric acid solution or in water as a solvent. The amination is carried out in the aqueous solution of the amine in the presence of molecular oxygen at a temperature in the range of 50° to 200° C., preferably 80° to 150° under autogeneous pressure for a period of 10 to 100 hours, preferably 20 to 50 hours. After completion of the reaction, the reaction solution is cooled, poured into cold water, neutralized as with hydrochloric acid, nitric acid, or sulfuric acid, and separated by filtration to afford a 5,6,7,8-tetrafluoroanthraquinonylamine.

Now, the method for the manufacture of the novel substance of this invention will be described more specifically below. The analyses of the substances obtained in the working examples for the determination of their structures will be also shown.

EXAMPLE 1

Synthesis of tetrafluorophthalonitrile

In an autoclave made of stainless steel and having an inner volume of 500 ml, 200 g of benzonitrile, 80.0 g (0.301 mol) of tetrachloro-orthophthalonitrile, and 83.9 g (1.444 mols) of potassium fluoride in a dry finely divided form were placed and, with the entrapped air in the autoclave displaced with nitrogen gas, heated and stirred for reaction at 230° C. for 10 hours. After completion of the reaction, the resultant reaction solution was cooled to room temperature and then filtered to remove suspended potassium chloride and unaltered potassium fluoride. The benzonitrile solution as mother liquid was analyzed by gas chromatography using a column packed with SE 52 in a length of 1 m and kept at 60° C. The analyses show that this reaction produced tetrafluoro-orthophthalonitrile in a yield of 87.7 mol% based on the tetrachloro-orthophthalonitrile used as the raw material. The mother liquid was vacuum distilled to expel benzonitrile and obtain crystals of tetrafluoro-orthophthalonitrile (m.p. 86° to 87° C.) which solidified at room temperature.

EXAMPLE 2

Synthesis of tetrafluorophthalic acid

In 60.0 g of an aqueous solution containing sulfuric acid in a concentration of 70.0% by weight, 20.0 g (0.100 mol) of the tetrafluorophthalonitrile obtained in Example 1 was stirred and heated at 157° to 162° C. for 15 hours. The resultant reaction solution was diluted by addition of 15 g of water. The diluted reaction solution was left cooling. The resultant slurry was mixed with 100 ml of ether to extract tetrafluorophthalic acid in the organic layer. This extraction was repeated twice. The ether layer consequently obtained was dried with magnesium sulfate and then evaporated to dryness. Consequently, there was obtained 22.1 g of white tetrafluorophthalic acid (in a yield of 95.0 mol% based on tetrafluorophthalonitrile).

EXAMPLE 3

Synthesis of tetrafluorophthalic anhydride

The amount of 20.0 g of tetrafluorophthalic acid (0.0840 mol) was dissolved and left standing for dehydration at temperatures of 160° to 170° C. for three hours. Thereafter, the dehydrated acid was left standing for sublimation at temperatures of 170° to 180° C. under a vacuum (5 Torrs). Consequently, there was obtained 18.0 g of tetrafluorophthalic anhydride.

EXAMPLE 4

Synthesis of 5,6,7,8-tetrafluoroquinizarin

Into a molten mixture (130° to 135° C.) of 7 g of common salt and 70 g of aluminum chloride, 11.0 g (0.050 mol) of tetrafluorophthalic anhydride and 10.3 g (0.075 mol) of 1,4-dimethoxybenzene were added piecemeal. After completion of the addition, the resultant mixture was heated and stirred at 200° C. for 30 minutes. Then, the resultant reaction mixture was poured into ice water. Subsequently, the cooled reaction mixture and 200 ml of concentrated hydrochloric acid added thereto were heated and stirred. The crystals which were consequently precipitated were separated by filtration, washed with cold water, and then dried. Consequently, there was obtained 11.1 g of 5,6,7,8-tetrafluoroquinizarin (in a yield of 71.1 mol% based on tetrafluorophthalic anhydride)

Melting point: 230° C. (recrystallized from benzene)
Elementary analyses:

|  | C (%) | H (%) | F (%) |
|---|---|---|---|
| Calculated | 53.85 | 1.28 | 24.36 |
| Found | 53.79 | 1.38 | 24.2 |

$^1$H NMR (solvent: D$_6$-DMSO, inner standard substance: TMC)
$\delta = 7.36$ (s, 2H)
$\delta = 12.23$ (b-s, 2H)
Mass analysis spectrum
m/e = 312 (M$^+$, 100)
m/e = 293 (M$^+$-19, 10)
Visible ray absorption spectrum (in benzene)
$\lambda$max; 475 nm ($\epsilon$; 6700)
$\lambda$max; 497 nm ($\epsilon$; 7300)
$\lambda$max; 530 nm ($\epsilon$; 4400)

EXAMPLE 5

Synthesis of 2,3-dibromo-5,6,7,8-tetrafluoroquinizarin

In 100 ml of concentrated sulfuric acid, 5.6 g (0.0179 mol) of 5,6,7,8-tetrafluoroquinizarin and 2.0 g of iodine were left standing for dissolution 125° C. The resultant solution and 17.1 g (0.107 mol) of bromine added thereto were stirred and heated at 125° C. for 50 minutes. The resultant reaction mixture was poured into ice water. The crystals which were precipitated were separated by filtration and washed with water. Consequently, there was obtained 7.17 g of 2,3-dibromo-5,6,7,8-tetrafluoroquinizarin (in a yield of 85.3 mol% based on 5,6,7,8-tetrafluoroquinizarin).

Melting point: 275° C. (recrystallized from benzene)
Elementary analyses:

|  | C (%) | H (%) | Br (%) | F (%) |
|---|---|---|---|---|
| Calculated | 35.76 | 0.42 | 34.01 | 16.18 |
| Found | 35.69 | 0.57 | 34.2 | 16.0 |

Mass analysis spectrum
m/e = 468 (M$^+$)
Visible ray absorption spectrum (in benzene)
$\lambda$max; 498 nm ($\epsilon$; 10200)
$\lambda$max; 505 nm ($\epsilon$; 10400)
$\lambda$max; 540 nm ($\epsilon$; 6200)

EXAMPLE 6

Synthesis of 5,6,7,8-tetrafluoro-1,4-bis(methylamino)anthraquinone

In 200 ml of glacial acetic acid, 7.80 g (0.025 mol) of the 5,6,7,8-tetrafluoroquinizarin obtained in Example 4 was dissolved. The resultant solution and 5.0 g of metallic tin added thereto were stirred and refluxed for one hour.

Then, the solution and 15 ml of concentrated hydrochloric acid added thereto dropwise were thermally refluxed for one hour. After completion of the reaction, the reaction mixture was diluted with water and left cooling. The precipitate consequently occurred was separated by filtration. This treatment produced 5,6,7,8-tetrafluoro-leucoquinizarin in a substantially quantitative yield. A solution of 3.30 g (0.0105 mol) of this 5,6,7,8-tetrafluoro-leucoquinizarin in 80 ml of an aqueous 40% methylamine solution was sealed in an autoclave in conjunction with air and stirred and heated at 100° C. for 35 hours. After completion of the reaction, the reaction solution was left cooling, poured into cold water, and subsequently neutralized with hydrochloric acid. The precipitate consequnetly occurred was separated by filtration, and then dried. As the result, there was obtained 3.27 g of 5,6,7,8-tetrafluoro-1,4-bis(methylamino)-anthraquinone (in a yield of 92.1 mol% based on 5,6,7,8-tetrafluoro-leucoquinizarin).

Elementary analyses:

|  | C (%) | H (%) | N (%) | F (%) |
|---|---|---|---|---|
| Calculated | 56.80 | 2.96 | 8.28 | 22.48 |
| Found | 56.9 | 3.3 | 8.4 | 22.0 |

Mass analysis spectrum
  m/e=338 (M+; 100)
  m/e=321 (M+-17; 70)
  m/e=306 (M+-32; 14)
  m/e=292 (M+-46; 9)
Visible ray absorption spectrum (in benzene)
  λmax; 662 nm (ε; 8300)
  λmax; 612 nm (ε; 8300)
  λmax; 580 nm (ε; 5150)

EXAMPLE 7

In an aqueous 25% ammonia solution, 3.30 g (0.0105 mol) of 5,6,7,8-tetrafluoro-leucoquinizarin obtained by the procedure of Example 6 was dissolved. The resultant solution was sealed in an autoclave in conjunction with air and stirred and heated at 120° C. for 30 hours. After completion of the reaction, the reaction solution was left cooling, then poured into cold water, and then neutralized with hydrochloric acid. The precipitate which consequently occurred was separated by filtration and dried. As the result, 2.20 g of 1-amino-5,6,7,8-tetrafluoro-4-hydroxyanthraquinone (in a yield of 67.4 mol% based on 5,6,7,8-tetrafluoro-leucoquinizarin).

Elementary analyses:

|  | C (%) | H (%) | N (%) | F (%) |
|---|---|---|---|---|
| Calculated | 54.02 | 1.61 | 4.50 | 24.44 |
| Found | 54.1 | 1.9 | 4.6 | 23.9 |

Mass analysis spectrum
  m/e=311 (M+; 100)
  m/e=257 (M+-54; 25)
  m/e=214 (M+-97; 10)
  m/e=186 (M+-125;12)
Visible ray absorption spectrum (in benzene)
  λmax; 555 nm (ε; 6000)
  λmax; 530 nm (ε; 5250)
  λmax; 595 nm (ε; 4200)

What is claimed is:

1. A 5,6,7,8-tetrafluoroanthraquinone derivative represented by the general formula I:

$$\text{(I)}$$

wherein $R^1$ and $R^2$ independently stand for —OH or $$-N\begin{smallmatrix}R^3\\R^4\end{smallmatrix}$$

(where $R^3$ and $R^4$ independently stand for hydrogen an alkyl of 1 to 4 carbon atoms or a phenyl) and X and Y independently hydrogen atom or a halogen atom.

2. A compound according to claim 1, wherein $R^1$ and $R^2$ in said general formula are independently hydroxyl, amino, or alkylamino.

3. A compound according to claim 2, wherein $R^1$ and $R^2$ are both hydroxyl and X and Y in said general formula are independently hydrogen atom or a halogen atom.

4. A compound according to claim 3, wherein X and Y are independently hydrogen atom or bromine atom.

5. A compound according to claim 4, which is 5,6,7,8-tetrafluoroquinizarin.

6. A compound according to claim 4, which is 2,3-dibromo-5,6,7,8-tetrafluoroquinizarin.

7. A compound according to claim 2, wherein $R^1$ is $$-N\begin{smallmatrix}R^3\\R^4\end{smallmatrix}$$

where $R^3$ and $R^4$ have the same meanings as defined above, $R^2$ is —OH or $$-N\begin{smallmatrix}R^3\\R^4\end{smallmatrix},$$

and X and Y are both hydrogen atom.

8. A compound according to claim 7, wherein $R^3$ and $R^4$ are independently hydrogen atom or methyl.

9. A compound according to claim 8, wherein $R^1$ and $R^2$ are independently amino or methylamino.

10. A compound according to claim 8, wherein $R^1$ is amino or methylamino and $R^2$ is hydroxy.

11. A compound according to claim 10, which is 1-amino-5,6,7,8-tetrafluoro-4-hydroxyanthraquinone.

12. A compound according to claim 9, which is 5,6,7,8-tetrafluoro-1,4-bis-methylaminoanthraquinone.

* * * * *